INVENTOR.
FRANCIS FOURNEL

INVENTOR
FRANCIS FOURNEL

United States Patent Office 3,423,363
Patented Jan. 21, 1969

3,423,363
FORMALDEHYDE POLYMERIZATION PROCESS AND APPARATUS
Francis Fournel, Paris, France, assignor to Produits Chimiques Pechiney Saint-Gobain, Paris, France
Filed Dec. 9, 1964, Ser. No. 417,081
Claims priority, application France, Dec. 13, 1963, 957,164/63
U.S. Cl. 260—67                    8 Claims
Int. Cl. C08g 1/02, 35/00

ABSTRACT OF THE DISCLOSURE

The production of improved polymers and copolymers of formaldehyde, by a new process and with new apparatus, characterized by the polymerization of the gaseous monomers in concentrated form in contact with a circulating body of granular formaldehyde polymer, the granules of the body being cooled to encourage the polymerization of the monomers solely upon the cooled granules of the polymer.

---

The present invention relates to a process of polymerization or copolymerization of compositions of formaldehyde as well as to apparatus for carrying out the process.

In accordance with the present invention a concentrated gaseous phase monomer of formaldehyde and a polymerization catalyst therefor, are brought simultaneously in contact with the surface of a reaction bed composed of dry granular polyformaldehyde in a reaction chamber. The reaction is exothermic and the reaction bed is maintained at a temperature favorable to the reaction by continuously withdrawing some of the polyformaldehyde from the bed, cooling the withdrawal material and returning a like amount of previously withdrawn and cooled material to the bed. In addition the bed is mixed constantly in order to continuously expose a fresh reaction surface to the monomer and catalyst and distribute cooled polyformaldehyde uniformly through the bed.

The apparatus for carrying out this process in accordance with the invention includes a rotary reaction chamber containing several balls or having vanes secured to the inner walls which tumble and mix the reaction bed as the chamber rotates. Inlets are provided for introducing the gaseous formaldehyde monomer and polymerization catalyst simultaneously into the chamber and a suitable outlet is provided for removal of the polymerized formaldehyde. The reaction bed is maintained at a temperature favorable to the polymerization by withdrawing metered amounts of the reaction bed from the chamber through a revolving valve, cooling the withdrawn material and returning cooled material to the bed through another revolving valve. The two revolving valves are arranged and operated to return to the bed an amount of cooled material equal to the amount being withdrawn so as to maintain the volume and level of the bed constant.

The reaction bed must be dry for the polymerization and the conveyor system may include means for drying the material of the reaction bed preparatory to the polymerization operation.

It is a principal object of the present invention to provide a process and apparatus for continuously polymerizing or copolymerizing a gaseous composition of formaldehyde by bringing a stream of the composition and a polymerization catalyst therefor simultaneously into contact with the surface of a reaction bed in a reaction chamber in which the conditions of temperature and pressure and the freshness of the reaction surface are maintained constantly favorable to the polymerization.

A further object is to provide apparatus of the above-mentioned type in which the reaction bed is maintained at a temperature favorable to the polymerization by continually withdrawing some of the material from the bed, cooling the withdrawn material and returning cooled material to the bed.

An additional object is to provide apparatus of the type described in which some material from the reaction bed is continually being withdrawn from the reaction chamber, circulated through conduits outside the reaction chamber and subsequently returned to the bed in the chamber and in which heat exchange means associated with the conduits may be utilized to dry the material of the bed preparatory to the commencement of polymerization and then, when polymerization is commenced, to continuously cool and remove moisture from material taken from the bed and circulated through the outside conduits.

Another object is to provide apparatus of the type described in which the reaction bed is tumbled constantly as means to continually mix and thereby refresh the surface of the reaction bed.

A still further object is to provide apparatus of the type described in which the reaction chamber is a rotary chamber having means therein to thoroughly mix and tumble the material of the reaction bed as chamber rotates.

Further objects and advantages of the process and apparatus of the present invention will be apparent from the following detailed description and accompanying drawings in which.

Figure 4:
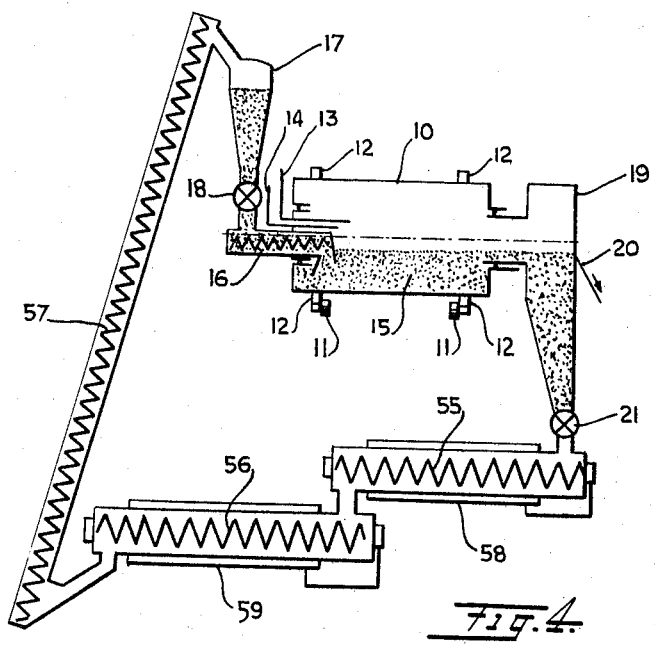
Figure 5:
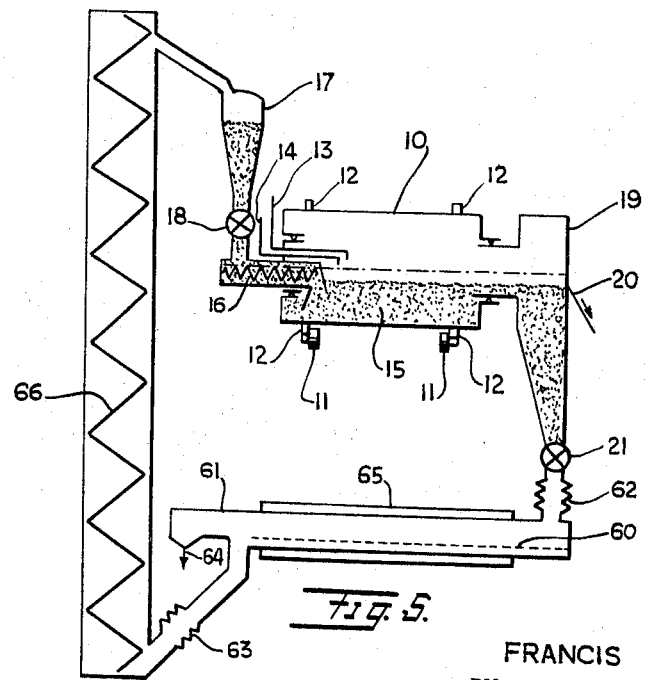

FIG. 4 is a schematic diagram of apparatus in accordance with the invention in which the material withdrawn from the reaction bed for cooling is transported by mechanical screw conveyors; in which the cooling is accomplished by circulating a cooling fluid through jackets around portions of the conveyor system; and in which, in addition, moisture may be removed from the material during operation of the apparatus by circulating a heated fluid through one of the jackets; and FIG. 5 is a schematic diagram of apparatus in accordance with the invention in which the material withdrawn from the reaction bed for cooling is cooled by being shaken through a vibrating chamber which has a cooling jacket around it.

In accordance with the process of the present invention streams of a gaseous phase monomer of formaldehyde and a polymerization catalyst therefor are simultaneously brought in contact with the surface of a raction bed of polyformaldehyde in a reaction chamber. The polymerization catalyst is suitably an amine, such as triethylamine, having a trivalent atom of nitrogen associated with at least 5 atoms of carbon. The polymerization catalyst is in a form adapted to flow into the reaction chamber in a stream and is suitably in the form of a powder (i.e. finely divided particles), a vapor or an aerosol.

The polyformaldehyde of the reaction bed is in the form of fine granules and is dry, containing less than 5% moisture.

The polymerization reaction occurs as the monomer and catalyst come in contact with the surface of the reaction bed in the reaction chamber and the reaction is exothermic. In order to have the reaction continuous as new monomer and catalyst flow into the chamber, the temperature in the chamber is maintained at a level favorable to the reaction (below 110° C. and preferably between 30° and 80° C.) and the reaction bed is agitated or mixed constantly so that the surface of the reaction bed is continuously being refreshed.

The reaction chamber is maintained at a favorable temperature by continuously withdrawing metered amounts of the polyformaldehyde from the reaction bed, cooling the withdrawn material and at the same time returning similar amounts of cooled material to the bed so that the bed remains at approximately the same level. The volume of the reaction bed is about 30% of the volume of the reaction chamber and the quantity of material withdrawn from the bed, cooled and returned to the bed in a given time is generally between 20 and 500, and preferably between 50 and 200, times the weight of new polymer produced on the bed in the same time. The exact rate at which the material from the reaction bed is circulated through the cooling cycle depends however upon the nature of the polymer or copolymer being produced and the characteristics of the cooling circuit.

The reaction bed is constantly agitated by rotating the reaction chamber about its longitudinal axis and by providing several balls in the chamber or vanes secured to the walls of the chamber so that the bed is thoroughly mixed by a tumbling action as the chamber rotates.

The polymerization process in accordance with this invention is normally carried out at approximately atmospheric pressure, but it is possible to carry it out at pressures above and below atmospheric. It is, however, highly desirable to avoid using formaldehyde monomers which are in, or return to, a liquid state at the working temperature and pressure in the reaction chamber since this causes a reaction which is difficult to control.

Looking now at the drawings, apparatus in accordance with the invention comprises a rotary reaction chamber 10 mounted for rotation about its longitudinal axis on supporting and driving rollers 11 which engage annular ribs 12 around the chamber 10. At one end of the chamber 10 are inlets 13 and 14 for conducting respectively a stream of a gaseous phase monomer of formaldehyde and a stream of a polymerization catalyst therefor simultaneously into the chamber where they come in contact with a bed 15 of granular polyformaldehyde therein.

At this same end of the chamber 10 is a screw type input conveyor 16 below a hopper 17 with a rotary valve 18 between the bottom of the hopper and the input conveyor by which polyformaldehyde is returned to the bed 17 after it has been cooled by a cooling and drying system which is subsequently described in detail.

At its other end, the reaction chamber 10 opens into a hopper 19 which has an outlet 20 in the side and a revolving valve 21 in the bottom. As indicated the reaction bed 15 occupies about 30% of the volume of the chamber 10 and extends through the opening in the end of the chamber 10 into the hopper 19 with the top of the bed 15 about level with the outlet 20 from the hopper so that new polymer produced on the top of the reaction bed 15 flows out through the outlet 20.

In the operation of the apparatus the rotation of the rotary reaction chamber 10 continually mixes the granular material of the reaction bed 15 so that the surface of the bed is continuously refreshed or renewed and thereby provides for a good continuous rate of reaction. The chamber 10 normally has several balls therein or has curved vanes (not shown) secured to its inner walls to enhance the mixing action.

In the five examples of apparatus of the invention illustrated in the drawings and described herein, the reaction chambers 10 and the elements associated therewith, with the exception of the cooling and drying systems, are similar and in the drawings similar numerals denote similar elements in each of the five figures.

Figure 1:
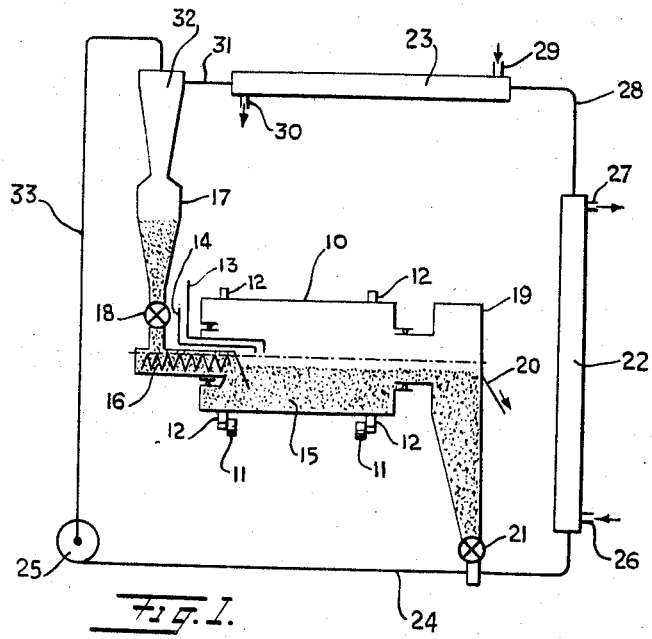
FIG. 1 is a schematic diagram of apparatus in accordance with the invention in which material withdrawn from the reaction bed to be cooled and returned is transported by suspending it in an inert gas in a pneumatic conveyor system and is cooled by circulating the suspended material through a heat exchanger.

In the apparatus illustrated in FIG. 1 the system for cooling and drying material from the reaction bed 15 is a pneumatic conveyor system in which the material withdrawn from the bed 15 by operation of the revolving valve 21 at the bottom of the hopper 19 is carried in a stream of an inert carrier gas, such as nitrogen, through a cooler 22 and a drier 23. The outlet of the valve 21 opens into a conduit 24 which is between a blower 25 and the cooler 22 and a stream of gas driven through the conduit 24 by the blower 25 picks up the granular reactor bed material passed into the conduit 24 by the valve 21 and carries it through the cooler 22. The cooler 22 is a heat exchanger having an inlet 26 and an outlet 27 for circulation of a coolant, such as cold brine, through the exchanger. From the cooler 22 the bed material flows through a conduit 28 to the drier 23 which is a heat exchanger having an inlet 29 and an outlet 30 for the circulation of steam therethrough. After passing through the drier 23 the bed material is carried by the gas stream through a conduit 31 to a cyclone separator 32 which separates the bed material from the carrier gas. The carrier gas flows out the top of the cyclone separator through a conduit 33 back to the blower 25 and the bed material drops into the hopper 17. The material which collects in the hopper 17 is then returned to the reaction bed 15 by the operation of revolving valve 18 and input conveyor 16. The revolving valve 18 is operated in time with the revolving valve 21 so that the amount of material returned to the bed 15 approximately equals the amount removed whereby the volume and surface level of the bed 15 remain substantially constant.

In operation the drier 23 is only used to prepare the bed 15 by drying it before the polymerization is commenced. For drying the bed the chamber 10 is rotated and the revolving valves 21 and 18 and blower 25 are operated to circulate material from the bed 15 through the cooling and drying system. Steam is circulated through the drier 23, but the flow of coolant to the cooler 22 is shut off and no monomer and catalyst are fed to the chamber. Then when the bed is sufficiently dry (less than 0.05% moisture) the stream to the drier 23 is shut off, the coolant to the cooler 22 is turned on and the flow of monomer and catalyst through the inlet tubes 13 and 14 to the chamber is started.

The operation of apparatus of FIG. 1 is illustrated by the following examples:

EXAMPLE Ia

The apparatus included a stainless steel rotary chamber having a capacity of 800 liters and having six curved vanes on its interior walls to assist the thorough mixing of the reaction bed 15 as the chamber rotated. The volume of the hopper 19 was about 200 liters.

The reaction bed 15 filled about one-half the chamber 10 and consisted of a polymer of formaldehyde in granular form and dried to contain less than 0.05% moisture.

The chamber 10 was rotated 16 revolutions per minute and the temperature in the chamber 10 was maintained at between 60° and 65° C. by withdrawing material from the bed 15 through the revolving valve 21, cooling the withdrawn material to 46° C. (measured in hopper 17) and returning cooled material to the bed at a rate of 600 kilograms per hour.

The material from the bed was carried through the cooling systems by a stream of nitrogen circulated by the blower 25 at 500 cubic meters per hour. The cooler 11 was a stainless steel heat exchanger having an effective heat transfer surface of 1.2 square meters and brine at a temperature of −15° C. was circulated through it at 2.5 cubic meters per hour.

The pressure within the chamber was slightly more than atmospheric.

A monomer consisting of dry gaseous formaldehyde was introduced into the chamber 10 at a rate of 8 kilograms per hour simultaneously with a polymerization catalyst which was triethylamine introduced at a rate of 100 milligrams per hour carried in a stream of nitrogen flowing at a rate of 50 liters per hour.

The gases thus introduced contained more than 99.5% of the formaldehyde monomer by weight.

This produced 7.6 kilograms per hour of new polymer of formaldehyde from the outlet 20. The average yield of the polymerization process was therefore about 95%.

EXAMPLE Ib

In the same apparatus used for Example Ia the monomer introduced into the chamber 10 was of a dry formaldehyde gas mixed with about 1% of furfuraldehyde which was prepared by bubbling pure formaldehyde through a flask containing furfuraldehyde which was maintained at a temperature of 80° C. This mixture was introduced at a rate of 8 kilograms per hour.

The polymerization catalyst was a mixture of alpha and beta picolines introduced at a rate of 1.6 grams per hour diluted in a stream of nitrogen flowing at 50 liters per hour.

The temperature in the reaction chamber 10 was maintained between 50° and 55° C. and the material from the reaction bed 15 was circulated through the cooling system at a rate of about 600 kilograms per hour and was cooled to about 38° C. as measured in the hopper 17.

The new polymer contained about 1% furfuraldehyde (measured spectrographically) and the yield was nearly equal to the amount of monomer introduced.

Figure 2:
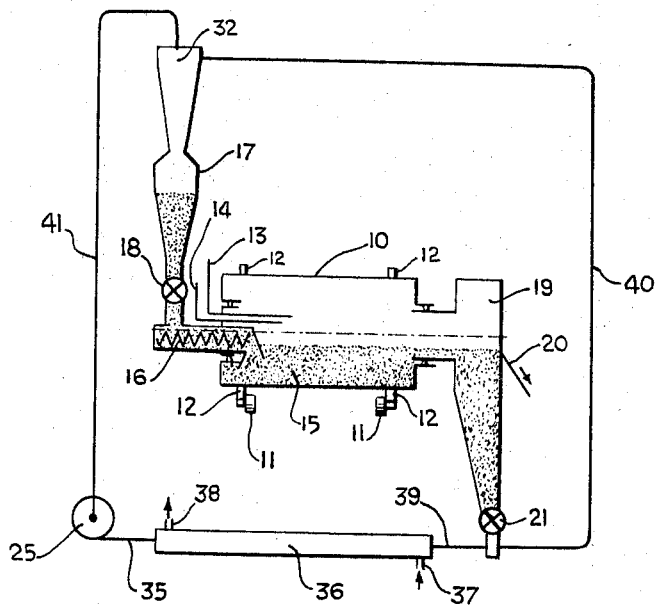
FIG. 2 is a schematic diagram of apparatus in accordance with the invention in which material withdrawn from the reaction bed for cooling is transported in an inert gas in a pneumatic system as in the apparatus of FIG. 1, but in which the cooling is accomplished by cooling the inert gas before the withdrawn material is suspended therein.

In the apparatus illustrated in FIG. 2 the cooling system is a pneumatic system and material withdrawn from the reaction bed 15 through the revolving valve 21 is cooled by previously cooling the inert gas (e.g. nitrogen) in which the bed material is carried. For this purpose a stream of inert carrier gas is forced by blower 25 through a conduit 35 to a cooler 36 which is a heat exchanger having an inlet 37 and an outlet 38 for circulation of a coolant, such as cold brine, therethrough.

From the cooler 36 the cooled carrier gas flows through a conduit 39 which connects with the outlet of revolving valve 21 so that the bed material withdrawn through the valve 21 is picked up by the cooled carrier gas flowing in the conduit. From the valve 21 a conduit 40 conducts the carrier gas and its load of bed material to the cyclone separator from which the gas flows through a conduit 41 back to the blower 25 and the bed material drops down with hopper 17 from which it is returned to the reaction bed 15.

The operation of the apparatus of FIG. 2 is illustrated by the following examples:

EXAMPLE IIa

The reaction chamber 10 was a stainless steel drum of 800 liters capacity, having vanes therein and rotated 16 revolutions per minute as in Examples Ia and Ib.

The reaction bed 15 filled about one-half the chamber 10 and was made up of polyformaldehyde powder containing less than 0.05% moisture. It was circulated through the cooling system at about 600 kilograms per hour in nitrogen circulated by the blower 25 at about 600 cubic meters per hour.

The nitrogen carrier gas was cooled in a cooler 36 having 1.5 square meters of heat transfer surface cooled by brine at −15° C. circulated through the cooler at a rate of about 2.5 cubic meters per hour.

This system cooled the bed material circulated in the cooling system at 40° C., as measured in hopper 17, so that the temperature of the reaction bed 15 in the chamber 10 was maintained between 50° and 55° C. The pressure was slightly above atmospheric.

Monomer consisting of pure dry formaldehyde gas was fed into the chamber 10 at 8 kilograms per hour. The catalyst which was hexatrimethylaminosilane diluted in a stream of 50 liters per hour of nitrogen was fed simultaneously into the chamber at a rate of 0.8 gram per hour.

New polymer was produced at a rate of about 8 kilograms per hour. The yield was therefore about equal to the monomer processed.

EXAMPLE IIb

The same apparatus and operating conditions as in Example IIa were used except that the catalyst was pyridine fed into the chamber at 2.5 grams per hour.

The results were the same as in Example IIa. That is, the yield of new polymer about equaled the monomer introduced.

Figure 3:
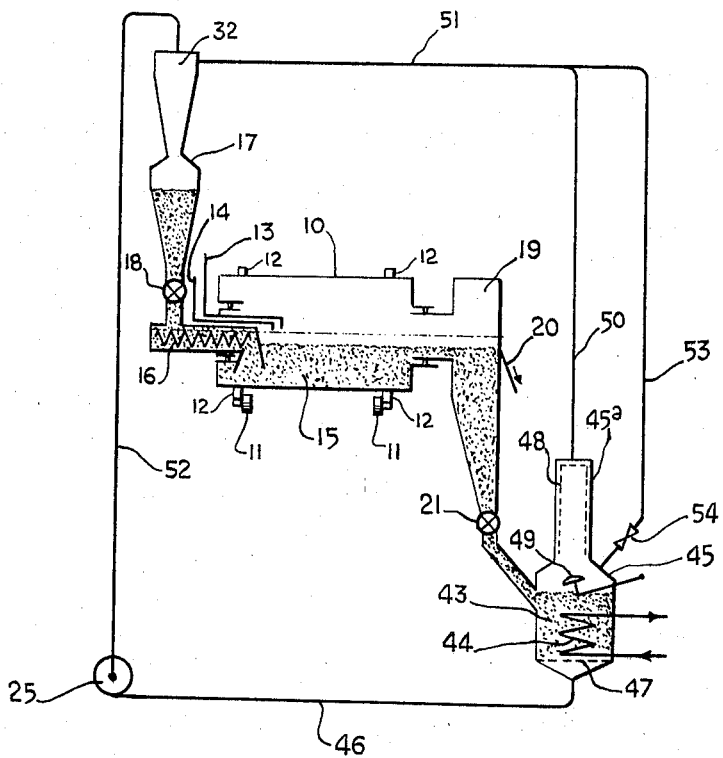
FIG. 3 is a schematic diagram of apparatus in accordance with the invention in which material withdrawn from the reaction bed to be cooled is transported by being suspended in an inert gas in a pneumatic conveyor system as in the apparatus of FIGS. 1 and 2 but in which the cooling is accomplished by periodically holding the material in a fluidized bed having a heat exchanger therein.

Looking now at FIG. 3, the apparatus of the invention illustrated has a cooling system in which the cooling is accomplished in a fluidized bed 43 having cooling coils 44 therein.

The fluidized bed 43 is formed in a chamber 45 with the powdered polymeric material of the reaction bed 15 which flows into the chamber 45 through the revolving valve 21. The material is fluidized by a stream of inert gas, such as nitrogen, circulated by the blower 25 through a conduit 46 to the bottom of the chamber 45 where it flows up through a screen 47 and through the bed material on the screen.

At the top of the chamber 45 is a cylindrical stack portion 45a having a filter 48 therein. A movable cap or valve 49 is arranged in the chamber 45 to close or open the stack portion 45a to the main part of the chamber in which the fluidized bed 43 is situated. A conduit 50 from the top of the chamber 45 connects the stack portion 45a into a conduit 51 which goes to the cyclone separator 32. From the cyclone separator gas is returned to the blower 25 through a conduit 52. The main part of the chamber 45 is also connected into the conduit 51 through a conduit 53 having a valve 54 therein and opening into the chamber 45 at a point below the stack portion 45a and valve 49.

For cooling the material withdrawn from the reaction bed 15 through the revolving valve 21, the valve 54 is closed and the valve 49 to stack portion 45a is opened. Material through the revolving valve 21 drops down into the main part of the chamber 45 where it is fluidized by the gas circulating up through the screen 47. The gas flows through the fluidized bed 43 through the stack portion 45a and through the conduits 50, 51 and 52 back to the blower 25. Any material carried up from the fluidized bed 43 is trapped by the filter 48 and falls back into the bed 43.

The material in the fluidized bed 43 is cooled by a coolant, such as cold brine, circulated through the cooling coils 44 in the bed. When the material has been cooled to the desired temperature, the valve 49 is closed and valve 54 is opened. The cooled material from the fluidized bed is then carried by the stream of gas out of the chamber 45 through conduits 53 and 51 to the cyclone separator 32 from which the cooled bed material drops into the hopper 17 to be returned by the input conveyor 16 to the reaction bed 15.

For the apparatus illustrated in FIG. 4 material withdrawn from the reaction bed 15 through the revolving valve 21 is carried by mechanical screw conveyors 55, 56, and 57 in a circuit back to the hopper 17. Cooling is accomplished by cooling jackets 58 and 59 respectively around the conveyors 55 and 56 through which a coolant, such as cold brine, is circulated. Both of the cooling jackets 58 and 59 may be used for cooling or one of them may be used as a heater by circulating steam through it as a means to remove small amounts of moisture which have been absorbed by the bed material during the process.

In the apparatus shown in FIG. 5 bed material withdrawn through the revolving valve 21 for cooling drops onto a vibrating screen 60 in a chamber 61 which has a flexible inlet 62 and a flexible outlet 63 in order to permit the chamber 61 to be vibrated. Any particles of the bed material which do not pass through the screen 60 are withdrawn from the chamber 61 through an outlet 64.

The bed material is cooled by a cooling jacket 65 around the chamber 61 by circulating a coolant, such as cold brine, through the jacket. From the chamber 61 the cooled bed material is carried to the hopper 17 by a mechanical screw elevator 66 and from the hopper 17 the material is returned to the reaction bed 15 by the inlet conveyor 16.

The process and apparatus in accordance with the invention as described above has the particular advantages of being simple and of producing uniformly high quality polymers at a good rate of continuous production.

The polymers and copolymers of formaldehyde produced by the process and with apparatus of the present invention are plastic resins which are useful for the production of molded or extruded articles or which may be drawn into fibers.

As many apparently widely different embodiments of the present invention may be made without departing from the spirit and scope thereof, it is to be understood that the invention is not limited to the specific embodiments.

What is claimed is:

1. An apparatus for the polymerization of formaldehyde, comprising a polymerization chamber, means to inject concentrated gaseous monomers of formaldehyde, into said chamber, means for withdrawing granular polymer from the chamber and for maintaining a body of granular polymer within said chamber, said body occupying at least about 30% of the volume of the chamber, means for feeding granules of polymer into the chamber, and means to maintain a selected temperature in the chamber comprising cooling means outside said chamber, and means for circulating granular polymer from the chamber through the cooling means and back to the chamber, said circulating means having a capacity to handle at least twenty times the weight of polymer as compared to the weight of monomer introduced, and means to mix the granular polymer in the chamber of the monomer.

2. An apparatus according to claim 1, in which the recycling circuit through the cooling means comprises pneumatic conveyor means and a separator for separating solids from gases.

3. A process for the continuous polymerization of a stream of gaseous monomeric formaldehyde, which comprises establishing a dry bed of granules of polyformaldehyde in a reaction chamber, injecting a stream of gaseous formaldehyde and a trace of catalyst into said chamber, moving the granules of said bed to contact the granules with the gaseous formaldehyde, maintaining the granules of the bed at a temperature favorable for the reaction polymerization of the formaldehyde composition at their surfaces to form desirable high molecular weight polymers, by removing a portion of said granules from the chamber, cooling the removed granules in a zone exteriorly of said reaction chamber to a temperature lower than that existing in any part of said reaction chamber, and reintroducing the cooled granules into the bed in said reaction chamber.

4. A process according to claim 3 which includes a composition of formaldehyde selected from the group consisting of monomeric formaldehyde and mixtures of monomeric formaldehyde and furfuraldehyde.

5. A process according to claim 4 in which the amount of granules removed from the bed exceeds the amount of granules returned to the bed by the amount of polymer produced and in which the amount of polymer granules returned to the bed is at least twenty times the amount of polymer produced.

6. A process according to claim 3 in which the volume of the reaction bed is from about 30% to about 50% of the volume of the reaction chamber.

7. A process according to claim 6 in which the quantity of the reaction bed withdrawn from the reaction bed, cooled and returned in a given time is within 200 to 500 times the quantity of new polymer produced upon the bed in the same time.

8. In the method according to claim 3 of continuously polymerizing formaldehyde in gaseous phase, by introducing simultaneously in a reaction chamber gaseous formaldehyde monomer and a catalyst in contact with a body of powdered polymer, the improvement which comprises establishing a body of powdered polymer in a rotary reaction chamber the volume of polymer being from about 30% to about 50% of the volume of the reaction chamber, the monomer being substantially pure, the thermal equilibrium of the reaction chamber being maintained by continuously withdrawing powdered polymer from said body, circulating it through an external cooling circuit and reintroducing it into the reactor, the quantity of the reaction bed withdrawn from the reactor, cooled and returned in a given time being within 20 to 500 times the quantity of new polymer produced in the same time.

References Cited

UNITED STATES PATENTS

| | | | |
|---|---|---|---|
| 3,215,505 | 11/1965 | Schmalfeld et al. | 23—288.3 XR |
| 3,233,981 | 2/1966 | Scott | 23—288.3 XR |
| 3,285,877 | 11/1966 | Kocher et al. | 260—67 |
| 2,951,059 | 8/1960 | Axtell et al. | 260—67 |
| 2,982,758 | 5/1961 | Michaud | 260—67 |
| 3,118,859 | 1/1964 | Delassus et al. | 260—67 |
| 3,281,395 | 10/1966 | Fukita et al | 260—67 |
| 3,296,205 | 1/1967 | Kocher et al. | 260—67 |

FOREIGN PATENTS

| | | |
|---|---|---|
| 1,285,909 | 1/1962 | France. |

WILLIAM H. SHORT, *Primary Examiner.*

L. M. PHYNES, *Assistant Examiner.*

U.S. Cl. X.R.

23—288.3